United States Patent
Huang et al.

(10) Patent No.: US 8,100,590 B2
(45) Date of Patent: Jan. 24, 2012

(54) MAINTENANCE MECHANISM FOR LIGHTING EQUIPMENT IN A CLOSED SPACE OF HIGH RADIATION ACTIVITY

(75) Inventors: Chi-Wen Huang, Taoyuan County (TW); Hsin-Chi Chu, Taoyuan County (TW); Bing-Rong Wu, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 117 days.

(21) Appl. No.: 12/533,004

(22) Filed: Jul. 31, 2009

(65) Prior Publication Data
US 2011/0026912 A1    Feb. 3, 2011

(51) Int. Cl.
*G03B 17/00* (2006.01)
*C21B 7/24* (2006.01)
(52) U.S. Cl. .................................. 396/428; 266/100
(58) Field of Classification Search .............. 396/428; 362/101, 147, 267; 220/662; 266/100
See application file for complete search history.

(56) References Cited

U.S. PATENT DOCUMENTS

| 6,179,435 | B1 * | 1/2001 | Wilson | 362/147 |
| 6,568,823 | B1 * | 5/2003 | Fielding et al. | 362/147 |

* cited by examiner

*Primary Examiner* — Clayton E LaBalle
*Assistant Examiner* — Autumn Parker

(57) ABSTRACT

The main objective of the present invention is to provide maintenance mechanism for lighting equipment in a closed space of high radiation activity, which comprises a passage, a lamp base, a multi-section slide rail, a lighting handle, a stainless steel fixation plate, a lead glass lamp guard and a convex lead plug. On the top side of the passage there is a multi-section slide rail with the lamp base attached to move the lamp. The maintenance hole at the end of the passage has a convex lead plug and a stainless steel fixation plate. When the hole closes, the convex lead plug is locked to the lead plug positioning screw under the stainless steel fixation plate; while the maintenance hole opens, on the top right and top left of the stainless steel fixation plate there is a L-shaped short iron plate and a L-shaped long iron plate respectively. On the L-shaped long iron plate there is an axial screw as the axis for the convex lead plug to move and rotate. On the L-shaped short iron plate there is a lead plug positioning screw for the convex lead plug after being pulled out to have temporary fixation. At the radiation space end of the passage there is a semi-circular lead glass lamp guard for the shielding wall to be fixed without moving with the lighting equipment.

11 Claims, 4 Drawing Sheets

MAINTENANCE MECHANISM FOR LIGHTING EQUIPMENT IN A CLOSED SPACE OF HIGH RADIATION ACTIVITY

BACKGROUND OF THE INVENTION

1. Field of the Invention

The present invention is related to a maintenance mechanism for the lighting equipment in a closed space of high radiation, especially a simple mechanism for applications in the maintenance of lighting or camera equipment in a closed space of high radiation activity to effectively reduce the exposure of maintenance workers to radiation.

2. Description of the Prior Art

In a closed space of high radiation activity it usually needs appropriate lighting to assist in the operation of camera monitoring system. However, lighting equipment only has a limited product life. Therefore, replacing lighting equipment may cause inconvenience. There is usually a certain thickness for the protective shield for a closed space of high radiation activity. Maintenance workers entering the closed space of high radiation activity need to wear thick and heavy protective clothing (lead apron) to reduce radiation absorbance and prevent exposure to radiation pollutants. This causes inconvenience for the maintenance work. Besides, maintenance workers entering the closed space of high radiation activity need to open the entrance, which is not only time-consuming and laborious but also likely to cause insufficient negative pressure for the closed space of high radiation activity and radiation leak. Complicated protective measures also impose much inconvenience to the operation of lighting maintenance, repair and adjustment.

SUMMARY OF THE INVENTION

To resolve the above issues, the present invention provides a simple and fast mechanism that only moves the lighting equipment to be serviced and repaired without the need of worker entering the closed space. It not only eliminates the troubles in maintenance process but also effectively reduces work exposure to radiation.

The main objective for the present invention is to provide a lighting maintenance mechanism on the shielding wall in a closed space of high radiation activity, which includes a passage, a lamp base, a multi-section slide rail, a lighting handle, a stainless steel fixation plate, a lead glass lamp guard and a convex lead plug. On the top side of the passage there is a multi-section slide rail with the lamp base attached to move the lamp. The maintenance hole at an end of the passage has a stainless steel fixation plate and a convex lead plug. The stainless steel fixation plate is attached to a wall by fixation plate screws (i.e. expansion screw). On the top right and top left of the stainless steel fixation plate there is an L-shaped short iron plate and an L-shaped long iron plate respectively. On the L-shaped long iron plate there is an axial screw as the axis for the convex lead plug to move and rotate. On the L-shaped short iron plate there is a lead plug positioning screw for the convex lead plug after being pulled out to have temporary fixation. The exterior of the convex lead plug is wrapped with a layer of stainless steel to increase rigidity and prevent deformation and human body from direct contacting toxic lead. The servicing hole on the convex lead plug opens and closes through the screw on the stainless steel fixation plate. When the hole closes, the convex lead plug is locked to the lead plug positioning screw under the stainless steel fixation plate; while the maintenance hole is opening, the convex lead plug is turned and uses the convex lead plug screw hole to lock to the lead plug at opening positioning screw on the L-shaped short iron plate for temporary fixation. The convex lead plug can effectively seal the passage opening to prevent radiation leak from the passage opening and the gap with the lead plug.

The production of the convex lead plug starts with making the mode with stainless steel that fits the actual passage shape and is embedded with suitable metal pipe for power source to facilitate adding power line during lead plug closing; and then fill the mold with lead.

The radiation space at the end of the passage has a semicircular lead glass lamp guard with airtight function. The guard is made from transparent and radiation-proof lead glass. Without affecting the illumination of lighting equipment, it also prevents and reduces internal radiation leak and maintains the negative pressure for the closed space of high radiation activity. The lead glass guard is fixed onto the shielding wall at the radiation space end of the passage.

In applications, lamp base can be modified to camera base to facilitate camera repair in a closed space of high radiation activity, and maintenance, replacement and angle adjustment for the camera. The lighting equipment and camera can share the same base, which allows increased visibility for the camera under auxiliary light source. Besides improved transparency, lead glass guard provides air tightness and radiation shielding to reduce the damage of radiation to camera and increase camera life. When the convex lead plug opens, the lead glass lamp guard also facilitates to reduce radiation leak.

The passage inside the radiation space that connects to the maintenance hole is usually located inside the shielding wall. If the passage is located inside the lead wall, stainless steel embedded pipe is needed to prevent the deformation of passage.

When the lighting equipment is broken, it only needs to open convex lead plug and pull out the lighting handle until the lighting equipment is completely outside the radiation space, and then quickly change the lighting equipment. After that, the slide rail is pushed back and the convex lead plug seals the passage opening to resume the original configuration. The maintenance process not only shortens the operation time but also effectively reduces the radiation exposure for workers.

DETAILED DESCRIPTION OF A PREFERRED EMBODIMENT

To achieve the above objectives, the technical approaches and the performance for the present invention are described by the following preferred embodiments with illustrative figures, so the examiners can get complete understanding.

Figure 1:
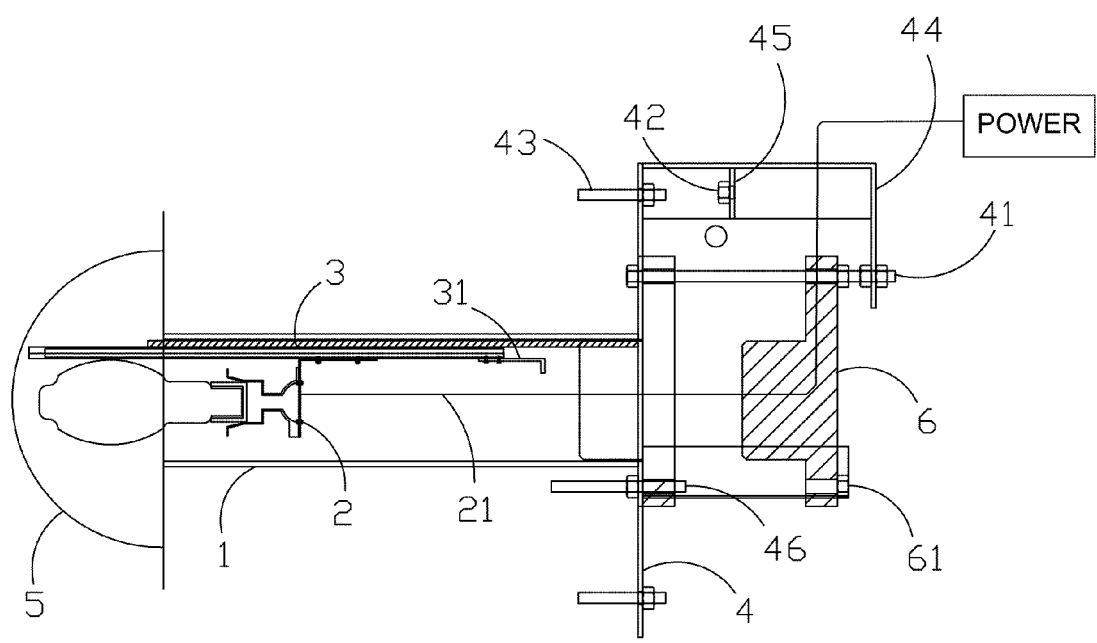
FIG. 1 is the cross-sectional structural diagram for the maintenance mechanism for lighting equipment in a closed space of high radiation activity for the present invention.
Figure 2:
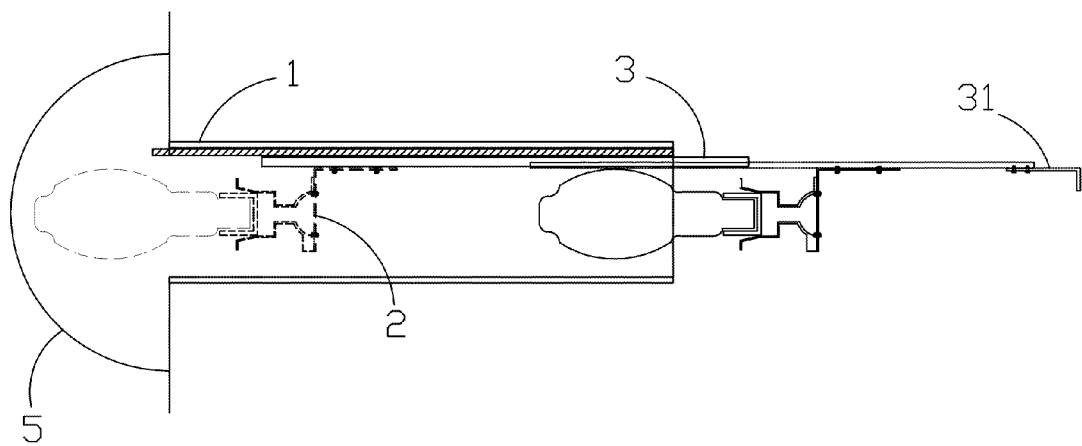
FIG. 2 is the diagram of moving the lighting equipment in the maintenance mechanism for lighting equipment in a closed space of high radiation activity for the present invention.
Figure 3:
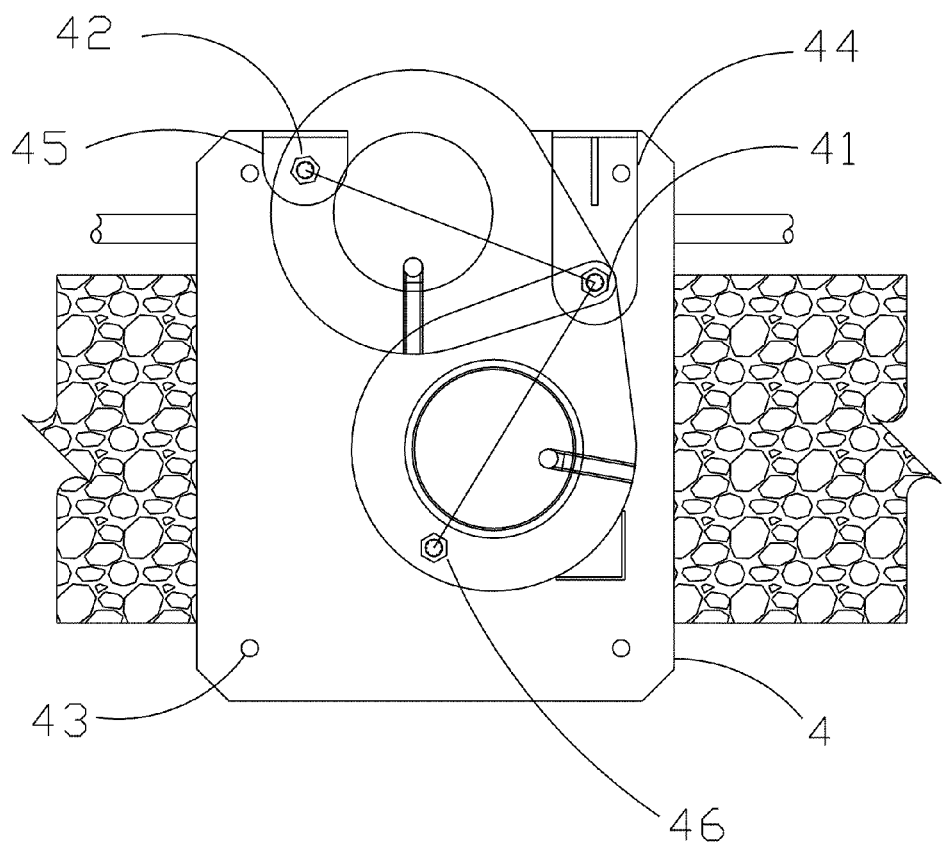
FIG. 3 is the front view of the operation of convex lead plug in the maintenance mechanism for lighting equipment in a closed space of high radiation activity for the present invention.

Please refer to the figures from FIG. 1 to FIG. 3. FIG. 1 is the cross-sectional structural diagram for the present invention and the structure comprises a passage 1, a lamp base 2, a multi-section slide rail 3, a lighting handle 31, a stainless steel fixation plate 4, a lead glass lamp guard 5 and a convex lead plug 6. In the passage 1, there is a multi-section slide rail 3; and on the passage 1, there is a lamp base 2 to carry lighting equipment or camera.

In the bottom of the lamp base 2, there is an electric wire 21 that goes out through the convex lead plug 6 to connect to external power source. In the maintenance hole at a side of the passage 1, there is a stainless steel fixation plate 4 that is fixed onto the wall by fixation plate screw 43. On its top left and top right, there are an L-shaped long iron plate 44 and an L-shaped short iron plate 45 respectively. The long iron plate 44 has an axial screw 41 as the axis for the convex lead plug 6 to move and rotate. The short iron plate has a lead plug opening and positioning screw 42 for the pulled-out convex lead plug 6 to turn and lock to the convex lead plug screw hole 61 for temporary fixation. With the maintenance hole on the cement wall, the above device can be directly placed in the passage 1. If the maintenance hole is on soft metal wall like lead wall, additional embedded stainless steel pipe is needed to prevent deformation of the passage 1.

FIG. 2 is the diagram of moving the lighting equipment in the present invention. The multi-section slide rail 3 can extend to meet the needs. The lighting handle 31 can pull the lamp base 2 out of the passage 1 and maintenance can proceed. After that, the lamp base 2 is pushed along the multi-section slide rail 3 back to its original place. At last, the multi-section slide rail 3 recedes to the passage 1 and closes the convex lead plug 6.

FIG. 3 is the front view of the convex lead plug and the stainless steel fixation plate for the present invention. The stainless steel fixation plate 4 is fixed onto the wall by the fixation plate screw 43. When the maintenance hole opens, the convex lead plug 6 uses the axial screw 41 to move and turn up, and the convex lead plug screw hole 61 locks the lead plug opening positioning screw 42 for temporary fixation. After the maintenance completed, the maintenance hole closes and the convex lead plug screw hole 61 is pulled away from the lead plug opening positioning screw 42, and then the convex lead plug 6 is turned downward to its original position and pushed into the passage 1, and after sealing, locked by the lead plug closing positioning screw 46 on the stainless steel fixation plate 4.

Figure 4:
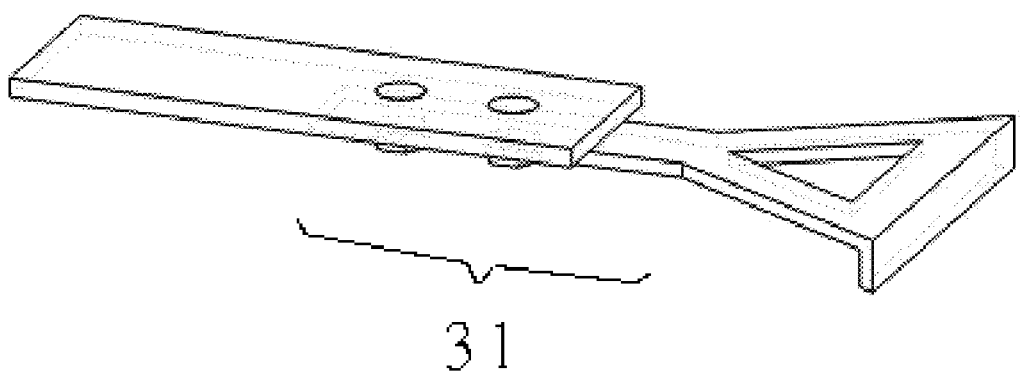
FIG. 4 is the diagram of the lighting handle in the maintenance mechanism for lighting equipment in a closed space of high radiation activity for the present invention.

FIG. 4 is the diagram of the lighting handle 31 for the present invention. For maintenance, it only needs to open the convex lead plug 6 and pull out the lighting handle 31 until the lighting equipment completely moves out of the radiation space, and then quickly change the lighting equipment. After that, the slide rail is pushed back and the convex lead plug 6 seals the passage opening to resume the original configuration.

What is claimed is:

1. A maintenance mechanism for lighting equipment in a closed space of high radiation activity, comprises a multi-section slide rail on one side of a passage, a lamp base located and moveable on the multi-section slide rail, a lighting handle, a lead glass lamp guard to prevent radiation leak into the passage, a convex lead plug to seal the maintenance hole, a stainless steel fixation plate to fix the convex lead plug, in which the stainless steel fixation plate uses a fixation plate screw to be fixed onto the maintenance hole side of the passage, and on the top of the fixation plate there are a L-shaped long iron plate and a L-shaped short iron plate;

wherein the convex lead plug that uses an axial screw on the L-shaped long iron plate as axis to move and rotate, having a lead plug opening positioning screw on the L-shaped short iron plate and a lead plug closing positioning screw in the bottom of the stainless steel fixation plate, in order to open and close the maintenance hole; and wherein the multi-section slide rail extends and recedes on one side along the passage during maintenance operation through the handle, pulling the lamp base out of the passage, and pushing back the lamp base along the multi-section slide rail to its original place after the maintenance operation.

2. The mechanism of claim 1, wherein when the maintenance hole opens, the convex lead plug is turned up and uses the convex lead plug screw hole to lock to the lead plug opening positioning screw on the L-shaped short iron plate for temporary fixation.

3. The mechanism of claim 1, wherein when the maintenance hole closes, the convex lead plug screw hole is turned downward to lock to the lead plug closing positioning screw under the stainless steel fixation plate.

4. The mechanism of claim 1, wherein the passage connecting the maintenance hole and radiation space is located inside a cement wall.

5. The mechanism of claim 1, wherein the passage connecting the maintenance hole and radiation space is stainless steel pipe embedded in a lead wall.

6. The mechanism of claim 1, wherein the multi-section slide rail can be extended to outside of the maintenance hole.

7. The mechanism of claim 1, wherein in the bottom of the lamp base there is an electric wire that goes out through the convex lead plug to connect to external power source.

8. The mechanism of claim 1, wherein the lead glass lamp guard is fixed onto a shielding wall at the radiation end of the passage.

9. The mechanism of claim 1, wherein the exterior of convex lead plug is wrapped with stainless steel or iron.

10. The mechanism of claim 1, wherein the lamp base can be converted to camera base.

11. The mechanism of claim 1, wherein the lighting equipment and camera can share the same base.

\* \* \* \* \*